United States Patent
Zhang et al.

(10) Patent No.: US 11,722,392 B2
(45) Date of Patent: Aug. 8, 2023

(54) NETWORK ADAPTER NODE PERFORMANCE DETECTION METHOD AND APPARATUS, DEVICE, AND READABLE MEDIUM

(71) Applicant: INSPUR SUZHOU INTELLIGENT TECHNOLOGY CO., LTD., Jiangsu (CN)

(72) Inventors: Ye Zhang, Jiangsu (CN); Jiwen He, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/925,083

(22) PCT Filed: Jan. 25, 2021

(86) PCT No.: PCT/CN2021/073604
§ 371 (c)(1),
(2) Date: Nov. 14, 2022

(87) PCT Pub. No.: WO2021/227556
PCT Pub. Date: Nov. 18, 2021

(65) Prior Publication Data
US 2023/0198876 A1  Jun. 22, 2023

(30) Foreign Application Priority Data
May 15, 2020 (CN) .......................... 202010410917.4

(51) Int. Cl.
*H04L 43/0817* (2022.01)
*H04L 43/12* (2022.01)

(52) U.S. Cl.
CPC .......... *H04L 43/0817* (2013.01); *H04L 43/12* (2013.01)

(58) Field of Classification Search
CPC .......................... H04L 43/0817; H04L 43/12
See application file for complete search history.

(56) References Cited

U.S. PATENT DOCUMENTS

| 6,865,689 B1 | 3/2005 | Gibson et al. |
| 2002/0114276 A1 | 8/2002 | Basturk |

(Continued)

FOREIGN PATENT DOCUMENTS

| CN | 104468316 A | 3/2015 |
| CN | 104468388 A | 3/2015 |

(Continued)

OTHER PUBLICATIONS

International Search Report of corresponding PCT Application PCT/CN2021/073604, dated Apr. 1, 2021, with English Translation, 5 pages.

(Continued)

*Primary Examiner* — Philip C Lee
(74) *Attorney, Agent, or Firm* — Cooper Legal Group LLC (57) ABSTRACT

A network adapter node performance detection method, includes: creating corresponding path test messages based on a plurality of ports of a node to be tested respectively, and sending the corresponding path test messages to a test node by means of the plurality of ports; receiving a path test message returned by the test node, and determining whether a port corresponding to the received path test message is consistent with a receiving port; in response to the fact that the port corresponding to the received path test message is consistent with the receiving port, sending a plurality of performance detection messages to the test node by means of the port; and receiving a performance detection message (Continued)

returned by the test node, and recording a performance parameter of the node to be tested to evaluate a state of the node to be tested.

20 Claims, 2 Drawing Sheets

(56) References Cited

U.S. PATENT DOCUMENTS

| | | | | |
|---|---|---|---|---|
| 2017/0366401 | A1* | 12/2017 | Jiang | ........................ H04L 41/40 |
| 2021/0258238 | A1* | 8/2021 | Bose | .................... G06F 9/45512 |

FOREIGN PATENT DOCUMENTS

| | | | |
|---|---|---|---|
| CN | 104486167 | A | 4/2015 |
| CN | 105100300 | A | 11/2015 |
| CN | 205067616 | A | 3/2016 |
| CN | 107070747 | A | 8/2017 |
| CN | 107257291 | A | 10/2017 |
| CN | 107995066 | A | 5/2018 |
| CN | 107995068 | A | 5/2018 |
| CN | 109462526 | A | 5/2018 |
| CN | 108366001 | A | 8/2018 |
| CN | 109450666 | A | 3/2019 |
| CN | 110377485 | A | 10/2019 |
| CN | 111585845 | A | 8/2020 |

OTHER PUBLICATIONS

Written Opinion of corresponding PCT Application PCT/CN2021/073604, dated Apr. 1, 2021, with English Translation, 9 pages.

Search Report of corresponding CN priority application 202010410917.4, with English Translation, 5 pages.

Office Action of corresponding CN priority application 202010410917.4, dated Jun. 4, 2021, with English Translation, 8 pages.

Karadeniz, et al., "Hardware Design and Implementation of a Network-on-Chip Based Load Balancing Switch Fabric", International Conference on Reconfigurable Computings and FPGAs, Dec. 5-7, 2012, pp. 1-7.

Notification to Grant Patent Right for Invention of corresponding CN priority application 202010410917.4, dated Aug. 9, 2021, with English Translation 3 pages.

Fang Zhou, Design and Implementation of Bonding-based Host Multi-homing in Universal Network,Chinese Master's Theses Full-text Database—Information Technology Album, Dated Aug. 15, 2008, with English Abstract, 80 pages.

* cited by examiner

NETWORK ADAPTER NODE PERFORMANCE DETECTION METHOD AND APPARATUS, DEVICE, AND READABLE MEDIUM

This application claims priority to Chinese Patent Application No. 202010410917.4, filed on May 15, 2020, in China National Intellectual Property Administration and entitled "Network Adapter Node Performance Detection Method and Apparatus, Device, and Readable Medium", the contents of which are hereby incorporated by reference in its entirety.

FIELD

The present disclosure relates to the technical field of computer communication networks, and particularly to a network adapter node performance detection method and apparatus, a device, and a readable medium.

BACKGROUND

Bond technology is a technology that virtualizes multiple network adapters into one. Through the bond technology, multiple network adapters are regarded as a single Ethernet interface device with the same Internet Protocol (IP) address. The principle of the bond technology is that network adapters run in a promisc mode. Generally, a network adapter receives only Ethernet frames whose destination hardware addresses are its own Media Access Control (MAC) address, and filters out other data frames, so as to reduce the burden of a driver. However, in the promisc mode, the network adapter receives all data frames on a network, and the MAC address in the driver is modified to make MAC addresses of two network adapters the same, such that data frames of a specific MAC address may be received and then the corresponding data frames are transmitted to the bond driver for processing.

The bond technology includes seven modes, where Bond4 is a load balancing mode. In this mode, each of messages passing through a system is transmitted by one of network adapters according to a hash algorithm, thereby realizing a function of distributing network adapter traffic to different network adapters as equally as possible.

Like a load balancing algorithm of Bond4, an upper-layer detection program is unable to sense a specific network adapter through which its own detection message is transmitted in and out, and as a result, it is impossible to implement analysis of network adapter performance and detection of a network state by conventional Packet Internet Groper (PING) or User Datagram Protocol (UDP) message detection.

SUMMARY

In view of this, an objective of embodiments of the present disclosure is to propose a network adapter node performance detection method and apparatus, a device, and a readable medium. Certain test messages are constructed to confirm that transmission and reception are both implemented by a transmitting/receiving path of a node to be tested, and detection messages are transmitted and received on the basis of the path. As such, the performance of a certain network adapter node is detected quickly, and an abnormality is timely evaluated and eliminated. Therefore, the stability and reliability of a network are improved.

Based on the above objective, an aspect of the embodiments of the present disclosure provide a network adapter node performance detection method, including the following steps: creating corresponding path test messages based on a plurality of ports of a node to be tested respectively, and sending the corresponding path test messages to a test node by means of the plurality of ports; receiving a path test message returned by the test node, and determining whether a port corresponding to the received path test message is consistent with a receiving port; in response to the fact that the port corresponding to the received path test message is consistent with the receiving port, sending a plurality of performance detection messages to the test node by means of the port; and receiving a performance detection message returned by the test node, and recording a performance parameter of the node to be tested to evaluate a state of the node to be tested.

In some embodiments, the step of receiving the performance detection message returned by the test node and recording the performance parameter of the node to be tested to evaluate the state of the node to be tested includes: receiving the performance detection message returned by the test node, and recording transmission and reception quantities and transmission and reception time of the node to be tested; calculating a packet loss rate based on the transmission and reception quantities of the node to be tested; and calculating a delay based on the transmission and reception time of the node to be tested.

In some embodiments, the step of receiving the performance detection message returned by the test node and recording the performance parameter of the node to be tested to evaluate the state of the node to be tested includes: receiving performance detection messages returned by a plurality of test nodes, and recording a plurality of sets of the transmission and reception quantities and a plurality of sets of the transmission and reception time of the node to be tested; calculating a plurality of corresponding packet loss rates based on the plurality of sets of the transmission and reception quantities of the node to be tested; and calculating a plurality of corresponding delays based on the plurality of sets of the transmission and reception time of the node to be tested.

In some embodiments, the method further includes: sorting the plurality of packet loss rates, and selecting a minimum packet loss rate as a packet loss rate of the node to be tested; and sorting the plurality of delays, and selecting a minimum delay as a delay of the node to be tested.

In some embodiments, the step of recording the performance parameter of the node to be tested to evaluate the state of the node to be tested includes: determining whether the packet loss rate/delay of the node to be tested is greater than a preset packet loss rate/delay threshold; and in response to a fact that the packet loss rate/delay of the node to be tested is greater than the preset packet loss rate/delay threshold, prompting a packet loss/delay abnormality, and disabling the node to be tested.

In some embodiments, the node to be tested is a network interface of a network adapter node to be tested, and the test node is any network adapter node with a same IP address as the network adapter node to be tested under a bond technology.

Another aspect of the embodiments of the present disclosure also provides a network adapter node performance detection apparatus, including: a transmitting path generation module, configured to create corresponding path test messages on the basis of a plurality of ports of a node to be tested respectively, and send the corresponding path test messages to a test node by means of the plurality of ports; a receiving path confirmation module, configured to receive a path test message returned by the test node, and determine whether a port corresponding to the received path test message is consistent with a receiving port; a detection module, configured to, in response to the fact that the port corresponding to the received path test message is consistent with the receiving port, send a plurality of performance detection messages to the test node by means of the port; and an evaluation module, configured to receive a performance detection message returned by the test node, and record a performance parameter of the node to be tested to evaluate a state of the node to be tested.

In some embodiments, the evaluation module is further configured to: receive the performance detection message returned by the test node, and record transmission and reception quantities and transmission and reception time of the node to be tested; calculate a packet loss rate on the basis of the transmission and reception quantities of the node to be tested; and calculate a delay on the basis of the transmission and reception time of the node to be tested.

Still another aspect of the embodiments of the present disclosure also provides a computer device, including: at least one processor; and a memory, where the memory stores a computer instruction capable of running in the at least one processor, and the instruction is executed by the at least one processor to implement the steps of the above method.

Yet still another aspect of the embodiments of the present disclosure also provides a computer-readable storage medium, storing a computer program that is executed by a processor to implement the steps of the above method.

The present disclosure has the following beneficial technical effects. Certain test messages are constructed to confirm that transmission and reception are both implemented by a transmitting/receiving path of a node to be tested, and detection messages are transmitted and received on the basis of the path. As such, the performance of a certain network adapter node is detected quickly, and an abnormality is timely evaluated and eliminated. Therefore, the stability and reliability of a network are improved.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other embodiments according to these drawings without creative work.

DETAILED DESCRIPTION

In order to make the objective, technical solutions, and advantages of the present disclosure clearer, the embodiments of the present disclosure will further be described below in detail in combination with certain embodiments and with reference to the drawings.

It is to be noted that all expressions made with "first" and "second" in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

Figure 1:
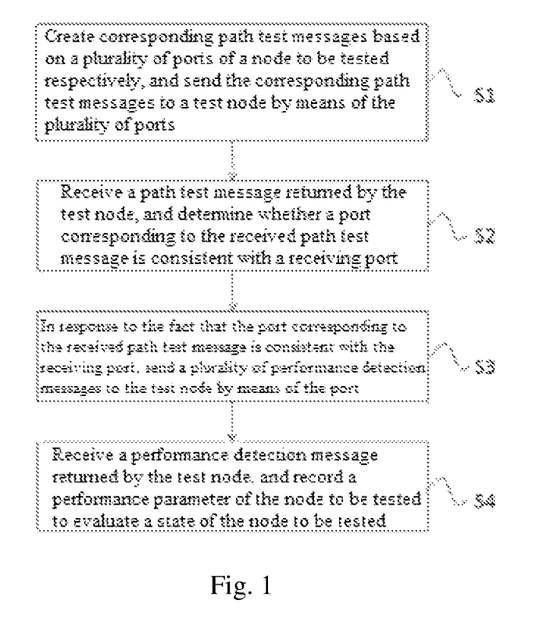
FIG. 1 is a schematic diagram of an embodiment of a network adapter node performance detection method according to the present disclosure.

Based on the above objective, a first aspect of the embodiments of the present disclosure proposes an embodiment of a network adapter node performance detection method. FIG. 1 is a schematic diagram of an embodiment of a network adapter node performance detection method according to the present disclosure. As shown in FIG. 1, the embodiment of the present disclosure includes the following steps.

In S1, corresponding path test messages are created on the basis of a plurality of ports of a node to be tested respectively, and the corresponding path test messages are sent to a test node by means of the plurality of ports.

In S2, a path test message returned by the test node is received, and whether a port corresponding to the received path test message is consistent with a receiving port is determined.

In S3, in response to the fact that the port corresponding to the received path test message is consistent with the receiving port, a plurality of performance detection messages are sent to the test node by means of the port.

In S4, a performance detection message returned by the test node is received, and a performance parameter of the node to be tested is recorded to evaluate a state of the node to be tested.

In the present embodiment, in a load balancing mode, each of messages passing through a system is transmitted by one of network adapters according to a hash algorithm, thereby realizing a function of distributing network adapter traffic to different network adapters as equally as possible. Network adapter nodes in the load balancing mode are set in order, recorded as node A, node B, node C, and node D. Each node obtains its own MAC address and MAC addresses of the other three nodes, and communicates with the other three nodes serving as test nodes. When node A is selected as a test node, a plurality of path test messages with port numbers are specified to be sent from a plurality of ports of network interface 1 of node A to node B, node C, or node D. Network interface 1 of node A receives returned path test messages, and determines whether port numbers are consistent. A path where a port receiving a path test message is consistent with the port number contained in the path test message is selected as a test path, namely a path where messages are transmitted and received through the same port of the same network interface of the same node is confirmed. Performance detection messages are transmitted and received based on the path, transmitting and receiving time and quantities are recorded, and three sets of delays and packet loss rates of messages of network interface 1 of node A passing through node B, node C, and node D respectively are calculated. The three sets of data are sorted, and the minimum delay and the minimum packet loss rate are selected and compared with set thresholds. In response to the fact that the minimum delay and the minimum packet loss rate are greater than the set thresholds, a delay abnormality or packet loss abnormality is prompted, and network interface 1 of node A is disabled. As such, whether the delay and packet loss of the network interface are abnormal is detected within 30 seconds, and in case of the delay or packet loss abnormality, the network interface is disabled quickly to eliminate a sub-health state of a network for a service shortly, improving the stability and reliability of the network.

In some embodiments of the present disclosure, the operation that a performance detection message returned by the test node is received and a performance parameter of the node to be tested is recorded to evaluate a state of the node to be tested includes the following operations: the performance detection message returned by the test node is received, and transmission and reception quantities and transmission and reception time of the node to be tested are recorded; a packet loss rate is calculated on the basis of the transmission and reception quantities of the node to be tested; and a delay is calculated on the basis of the transmission and reception time of the node to be tested. Here, the delay is the receiving time minus the transmitting time, and the packet loss rate is 1 minus the receiving quantity/transmitting quantity.

In some embodiments of the present disclosure, the operation that a performance detection message returned by the test node is received and a performance parameter of the node to be tested is recorded to evaluate a state of the node to be tested includes the following operations: performance detection messages returned by a plurality of test nodes are received, and a plurality of sets of transmission and reception quantities and a plurality of sets of transmission and reception time of the node to be tested are recorded; a plurality of corresponding packet loss rates are calculated on the basis of the plurality of sets of transmission and reception quantities of the node to be tested; and a plurality of corresponding delays are calculated on the basis of the plurality of sets of transmission and reception time of the node to be tested. The plurality of packet loss rates are sorted, and the minimum packet loss rate is selected as a packet loss rate of the node to be tested. The plurality of delays are sorted, and the minimum delay is selected as a delay of the node to be tested.

In some embodiments of the present disclosure, the operation that a performance parameter of the node to be tested is recorded to evaluate a state of the node to be tested includes the following operations: whether the packet loss rate of the node to be tested is greater than a preset packet loss rate threshold is determined, and in response to the fact that the packet loss rate of the node to be tested is greater than the preset packet loss rate threshold, a packet loss abnormality is prompted, and the node to be tested is disabled; and/or, whether the delay of the node to be tested is greater than a preset delay threshold is determined, and in response to the fact that the delay of the node to be tested is greater than the preset delay threshold, a delay abnormality is prompted, and the node to be tested is disabled.

In some embodiments of the present disclosure, the node to be tested is a network interface of a network adapter node to be tested, and the test node is any network adapter node with a same IP address as the network adapter node to be tested under a bond technology. Bond technology is a technology that virtualizes multiple network adapters into one. Through the bond technology, multiple network adapters are regarded as a single Ethernet interface device with the same IP address. The principle of the bond technology is that network adapters run in a promisc mode. Generally, a network adapter only receives Ethernet frames whose destination hardware addresses are its own MAC address, and filters other data frames, so as to reduce the burden of a driver. However, in the promisc mode, the network adapter receives all data frames over a network, and MAC addresses in drivers are modified in a manner that the MAC addresses of two network adapters are modified to be the same such that data frames of a certain MAC address may be received and then the corresponding data frame is transmitted to the bond driver for processing. The bond technology includes seven modes, where Bond4 is a load balancing mode. In this mode, each of messages passing through a system is transmitted by one of network adapters according to a hash algorithm, thereby realizing a function of distributing network adapter traffic to different network adapters as equally as possible.

It is to be pointed out that the steps in each embodiment of the network adapter node performance detection method may be mutually intersected, replaced, added, and deleted. Therefore, these reasonable permutations, combinations, and transformations about the network adapter node performance detection method shall also fall within the scope of protection of the present disclosure, and the scope of protection of the present disclosure should not be limited to the embodiments.

Figure 2:
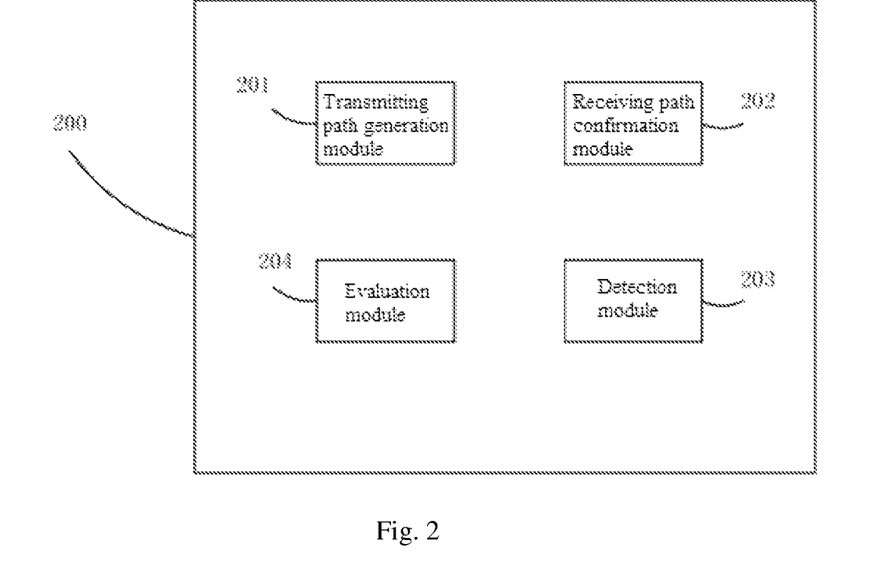
FIG. 2 is a schematic diagram of an embodiment of a network adapter node performance detection apparatus according to the present disclosure.

Based on the above objective, a second aspect of the present disclosure proposes a network adapter node performance detection apparatus 200, which, as shown in FIG. 2, includes: a transmitting path generation module 201, configured to create corresponding path test messages on the basis of a plurality of ports of a node to be tested respectively, and send the corresponding path test messages to a test node by means of the plurality of ports; a receiving path confirmation module 202, configured to receive a path test message returned by the test node, and determine whether a port corresponding to the received path test message is consistent with a receiving port; a detection module 203, configured to, in response to the fact that the port corresponding to the received path test message is consistent with the receiving port, send a plurality of performance detection messages to the test node by means of the port; and an evaluation module 204, configured to receive a performance detection message returned by the test node, and record a performance parameter of the node to be tested to evaluate a state of the node to be tested.

In some embodiments of the present disclosure, the evaluation module 204 is further configured to: receive the performance detection message returned by the test node, and record transmission and reception quantities and transmission and reception time of the node to be tested; calculate a packet loss rate on the basis of the transmission and reception quantities of the node to be tested; and calculate a delay on the basis of the transmission and reception time of the node to be tested.

Figure 3:
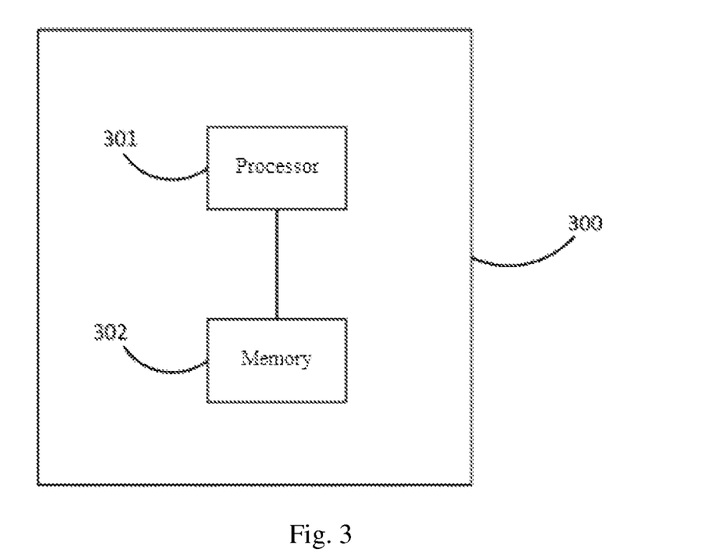
FIG. 3 is a schematic diagram of an embodiment of a computer device for network adapter node performance detection according to the present disclosure.

Based on the above objective, a third aspect of the embodiments of the present disclosure proposes a computer device 300, which, as shown in FIG. 3, includes: at least one processor 301; and a memory 302. The memory 302 stores a computer instruction capable of running in the processor 301. The instruction is executed by the at least one processor 301 to implement the steps of the above method.

Figure 4:
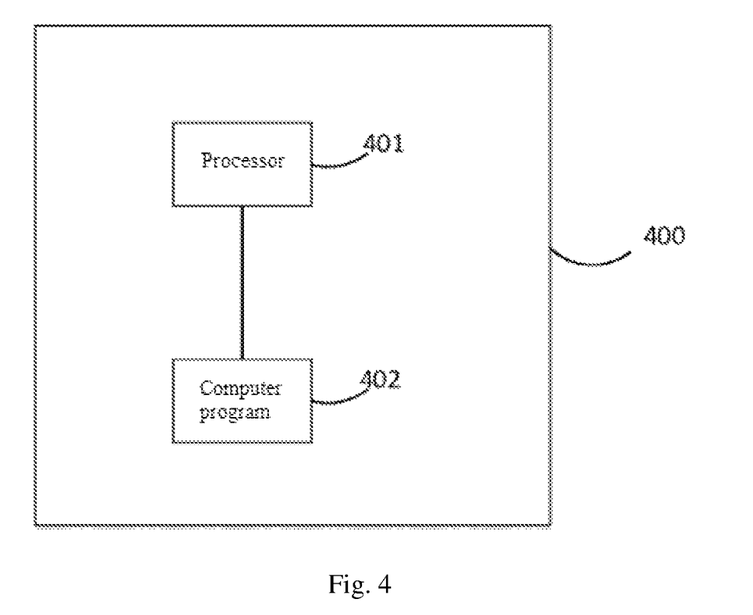
FIG. 4 is a schematic diagram of an embodiment of a storage medium for network adapter node performance detection according to the present disclosure.

As shown in FIG. 4, the present disclosure also provides a computer-readable storage medium 400. The computer-readable storage medium 400 stores a computer program 402 that is executed by a processor 401 to perform the above method.

It is finally to be noted that those ordinarily skilled in the art can understand that all or part of the flows in the method of the above-mentioned embodiment may be completed by a computer program by instructing related hardware. The program for the network adapter node performance detection method may be stored in a computer-readable storage medium. When the program is executed, the flows of each method embodiment may be included. The storage medium that stores the program may be a magnetic disk, an optical disk, a Read-Only Memory (ROM), a Random Access Memory (RAM), etc. The embodiment of the computer program may have effects the same as or similar to those in any corresponding method embodiment.

In addition, the method disclosed according to the embodiments of the present disclosure may also be implemented as a computer program executed by a processor. The computer program may be stored in a computer-readable storage medium. When the computer program is executed by the processor, the functions defined in the method disclosed in the embodiments of the present disclosure are executed.

Moreover, each method step and system unit may also be implemented by a controller and a computer-readable storage medium configured to store a computer program that enables the controller to implement the steps or functions of the units.

Furthermore, it is to be understood that the computer-readable storage medium (such as a memory) herein may be a volatile memory or a nonvolatile memory, or may include both a volatile memory and a nonvolatile memory. As an example rather than restriction, the nonvolatile memory may be a ROM, a Programmable ROM (PROM), an Erasable PROM (EPROM), an Electrically EPROM (EEPROM), or a flash memory. The volatile memory may include a RAM that may be used as an external cache memory. As an example rather than restriction, the RAM may be obtained in various forms, such as a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM), and a Direct Rambus RAM (DRRAM). The storage device in the disclosed aspect is intended to include, but not limited to, these or other proper types of memories. The storage device in the disclosed aspect is intended to include, but not limited to, these or other proper types of memories.

It is also understood by those skilled in the art that various exemplary logic blocks, modules, circuits, and algorithm steps described in combination with the disclosure herein may be implemented as electronic hardware, computer software, or a combination thereof. For ease of description about such interchangeability of hardware and software, functions of various schematic components, blocks, modules, circuits, and steps are described generally. Whether these functions are implemented as software or hardware depends on certain applications and design constraints on the whole system. Those skilled in the art may realize the functions for each certain application in various manners, but such realization should not be explained as resulting in departure from the scope disclosed in the embodiment of the present disclosure.

Various exemplary logical blocks, modules, and circuits described in combination with the disclosure herein may be implemented or executed by the following components designed to execute the functions herein: a general-purpose processor, a Digital Signal Processor (DSP), an Application Specific Integrated Circuit (ASIC), a Field Programmable Gate Array (FPGA) or another programmable logic device, a discrete gate or transistor logic, a discrete hardware component, or any combination thereof. The general-purpose processor may be a microprocessor. Alternatively, the processor may be any conventional processor, controller, microcontroller, or state machine. Alternatively, the processor may be implemented as a combination of computing devices, such as a combination of a DSP and a microprocessor, multiple microprocessors, a combination of one or more microprocessors and a DSP, and/or any other such configuration.

The steps of the method or algorithm described in combination with the disclosure herein may be directly included in hardware, a software module executed by the processor, or a combination thereof. The software module may be located in a RAM, a flash memory, a ROM, an EPROM, an EEPROM, a register, a hard disk, a removable disk, a Compact Disc ROM (CD-ROM), or a storage medium of any other form well known in this art. The storage medium is exemplarily coupled to the processor such that the processor may read information from the storage medium or write information to the storage medium. In an alternative solution, the storage medium may be integrated with the processor. The processor and the storage medium may be located in an ASIC. The ASIC may be located in a user terminal. In an alternative solution, the processor and the storage medium may be located in a user terminal as discrete components.

In one or more exemplary designs, the function may be realized in hardware, software, firmware, or any combination thereof. If being realized in software, the function may be stored in a computer-readable medium or transmitted through the computer-readable medium as one or more instructions or codes. The computer-readable medium includes a computer storage medium and a communication medium. The communication medium includes any medium that helps transmit a computer program from one position to another. The storage medium may be any available medium accessible for a general-purpose or special-purpose computer. As an example rather than restriction, the computer-readable medium may include a RAM, a ROM, an EEPROM, a CD-ROM or another optical disc storage device, a disk storage device or another magnetic storage device, or any other medium available for carrying or storing a needed program code in form of an instruction or a data structure and accessible for a general-purpose or special-purpose computer or a general-purpose or special-purpose processor. In addition, any connection may be referred to as a computer-readable medium as appropriate. For example, if a coaxial cable, a fiber optic cable, a twisted pair, a Digital Subscriber Line (DSL), or a wireless technology like infrared, radio, and microwave is used to send software from a website, a server, or another remote source, the coaxial cable, the fiber optic cable, the twisted pair, the DSL, or the wireless technology like infrared, radio, and microwave is included in the definition of the medium. As used herein, the magnetic disk and the optical disc include a Compact Disc (CD), a laser disc, an optical disc, a Digital Versatile Disc (DVD), a floppy disc, and a blue-ray disc. Generally, the magnetic disk magnetically reproduces data, while the optical disc optically reproduces data using laser. Combinations of the above-mentioned contents should also be included in the scope of the computer-readable medium.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any certain sequence. In addition, the element disclosed in the embodiments of the present disclosure may be described or required in an individual form, but may be understood as a plural form, unless clearly limited to a singular form.

It is to be understood that, as used herein, the singular form "a/an" is intended to include the plural form also, unless exceptional cases are supported clearly in the context. It is also to be understood that "and/or" used herein refers to including any or all possible combinations of one or more than one item that is listed associatively.

The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a program by instructing related hardware. The program may be stored in a computer-readable storage medium. The above-mentioned storage medium may be a ROM, a magnetic disk, an optical disk, or the like.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure as described above, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A network adapter node performance detection method, characterized by comprising the following steps:
    creating path test messages with respective port numbers based on a plurality of ports of a node to be tested respectively, and sending the path test messages to a test node by means of the plurality of ports;
    receiving the path test message returned by the test node, and determining whether a port number of the received path test message is consistent with a port number of a receiving port;
    in response to the port number of the received path test message being consistent with the port number of the receiving port, sending a plurality of performance detection messages to the test node by means of the port; and
    receiving the performance detection messages returned by the test node, and recording a performance parameter of the node to be tested to evaluate a state of the node to be tested;
    wherein the node to be tested is a network interface of a network adapter node to be tested, and the test node is any network adapter node with a same Internet Protocol (IP) address as the network adapter node to be tested under a bond technology.

2. The network adapter node performance detection method according to claim 1, wherein the step of receiving the performance detection messages returned by the test node and recording the performance parameter of the node to be tested to evaluate the state of the node to be tested comprises:
    receiving the performance detection messages returned by the test node, and recording transmission and reception quantities and transmission and reception time of the node to be tested;
    calculating a packet loss rate based on the transmission and reception quantities of the node to be tested; and
    calculating a delay based on the transmission and reception time of the node to be tested.

3. The network adapter node performance detection method according to claim 1, wherein the step of receiving the performance detection messages returned by the test node and recording the performance parameter of the node to be tested to evaluate the state of the node to be tested comprises:
    receiving performance detection messages returned by a plurality of test nodes, and recording a plurality of sets of transmission and reception quantities and a plurality of sets of transmission and reception time of the node to be tested;
    calculating a plurality of corresponding packet loss rates based on the plurality of sets of the transmission and reception quantities of the node to be tested; and
    calculating a plurality of corresponding delays based on the plurality of sets of the transmission and reception time of the node to be tested.

4. The network adapter node performance detection method according to claim 3, wherein the method further comprises:
    sorting the plurality of corresponding packet loss rates, and selecting a minimum packet loss rate as a packet loss rate of the node to be tested; and
    sorting the plurality of corresponding delays, and selecting a minimum delay as a delay of the node to be tested.

5. The network adapter node performance detection method according to claim 2, wherein the step of recording the performance parameter of the node to be tested to evaluate the state of the node to be tested comprises:
    determining whether the packet loss rate and/or delay of the node to be tested is greater than a preset packet loss rate and/or delay threshold; and
    in response to the packet loss rate and/or delay of the node to be tested being greater than the preset packet loss rate and/or delay threshold, prompting a packet loss and/or delay abnormality, and disabling the node to be tested.

6. A computer device, characterized by comprising:
    at least one processor; and
    a memory, wherein the memory stores a computer instruction configured to run in the at least one processor, and the computer instruction is executed by the at least one processor to implement any steps of:
    creating path test messages with respective port numbers based on a plurality of ports of a node to be tested respectively, and sending the path test messages to a test node by means of the plurality of ports;
    receiving the path test message returned by the test node, and determining whether a port number of the received path test message is consistent with a port number of a receiving port;
    in response to the port number of the received path test message being consistent with the port number of the receiving port, sending a plurality of performance detection messages to the test node by means of the port; and
    receiving the performance detection messages returned by the test node, and recording a performance parameter of the node to be tested to evaluate a state of the node to be tested;
    wherein the node to be tested is a network interface of a network adapter node to be tested, and the test node is any network adapter node with a same Internet Protocol (IP) address as the network adapter node to be tested under a bond technology.

7. A non-transitory computer-readable storage medium, storing a computer program, characterized in that the computer program is executed by a processor to implement any steps of:
creating path test messages with respective port numbers based on a plurality of ports of a node to be tested respectively, and sending the path test messages to a test node by means of the plurality of ports;
receiving the path test message returned by the test node, and determining whether a port number of the received path test message is consistent with a port number of a receiving port;
in response to the port number of the received path test message being consistent with the port number of the receiving port, sending a plurality of performance detection messages to the test node by means of the port; and
receiving the performance detection messages returned by the test node, and recording a performance parameter of the node to be tested to evaluate a state of the node to be tested;
wherein the node to be tested is a network interface of a network adapter node to be tested, and the test node is any network adapter node with a same Internet Protocol (IP) address as the network adapter node to be tested under a bond technology.

8. The network adapter node performance detection method according to claim 1, wherein the method further comprises:
transmitting each of the plurality of performance detection messages according to a hash algorithm, and thus realizing a function of distributing network adapter traffic to respective network adapters equally.

9. The network adapter node performance detection method according to claim 2, wherein the delay is receiving time minus transmitting time, and the packet loss rate is 1 minus receiving quantity and/or transmitting quantity.

10. The computer device according to claim 9, wherein the at least one processor, upon execution of the computer instruction, is further configured to:
receive the performance detection messages returned by the test node, and record transmission and reception quantities and transmission and reception time of the node to be tested;
calculate a packet loss rate based on the transmission and reception quantities of the node to be tested; and
calculate a delay based on the transmission and reception time of the node to be tested.

11. The computer device according to claim 6, wherein the at least one processor, upon execution of the computer instruction, is further configured to:
transmit each of the plurality of performance detection messages according to a hash algorithm, and thus realize a function of distributing network adapter traffic to respective network adapters equally.

12. The computer device according to claim 10, wherein the delay is receiving time minus transmitting time, and the packet loss rate is 1 minus receiving quantity and/or transmitting quantity.

13. The computer device according to claim 6, wherein the at least one processor, upon execution of the computer instruction, is further configured to:
receive performance detection messages returned by a plurality of test nodes, and record a plurality of sets of transmission and reception quantities and a plurality of sets of transmission and reception time of the node to be tested;
calculate a plurality of corresponding packet loss rates based on the plurality of sets of the transmission and reception quantities of the node to be tested; and
calculate a plurality of corresponding delays based on the plurality of sets of the transmission and reception time of the node to be tested.

14. The computer device according to claim 13, wherein the at least one processor, upon execution of the computer instruction, is further configured to:
sort the plurality of corresponding packet loss rates, and select a minimum packet loss rate as a packet loss rate of the node to be tested; and
sort the plurality of corresponding delays, and select a minimum delay as a delay of the node to be tested.

15. The computer device according to claim 10, wherein the at least one processor, upon execution of the computer instruction, is further configured to:
determine whether the packet loss rate and/or delay of the node to be tested is greater than a preset packet loss rate and/or delay threshold; and
in response to the packet loss rate and/or delay of the node to be tested being greater than the preset packet loss rate and/or delay threshold, prompt a packet loss and/or delay abnormality, and disable the node to be tested.

16. The non-transitory computer-readable storage medium according to claim 7, wherein the computer program, upon execution by the processor, is further configured to cause the processor to:
receive the performance detection message returned by the test node, and record transmission and reception quantities and transmission and reception time of the node to be tested;
calculate a packet loss rate based on the transmission and reception quantities of the node to be tested; and
calculate a delay based on the transmission and reception time of the node to be tested.

17. The non-transitory computer-readable storage medium according to claim 7, wherein the computer program, upon execution by the processor, is further configured to cause the processor to:
transmit each of the plurality of performance detection messages according to a hash algorithm, and thus realize a function of distributing network adapter traffic to respective network adapters equally.

18. The non-transitory computer-readable storage medium according to claim 7, wherein the computer program, upon execution by the processor, is further configured to cause the processor to:
receive performance detection messages returned by a plurality of test nodes, and record a plurality of sets of transmission and reception quantities and a plurality of sets of transmission and reception time of the node to be tested;
calculate a plurality of corresponding packet loss rates based on the plurality of sets of the transmission and reception quantities of the node to be tested; and
calculate a plurality of corresponding delays based on the plurality of sets of the transmission and reception time of the node to be tested.

19. The non-transitory computer-readable storage medium according to claim 18, wherein the computer program, upon execution by the processor, is further configured to cause the processor to:

sort the plurality of corresponding packet loss rates, and select a minimum packet loss rate as a packet loss rate of the node to be tested; and sort the plurality of corresponding delays, and select a minimum delay as a delay of the node to be tested.

20. The non-transitory computer-readable storage medium according to claim 16, wherein the computer program, upon execution by the processor, is further configured to cause the processor to:

determine whether the packet loss rate and/or delay of the node to be tested is greater than a preset packet loss rate and/or delay threshold; and in response to the packet loss rate and/or delay of the node to be tested being greater than the preset packet loss rate and/or delay threshold, prompt a packet loss and/or delay abnormality, and disable the node to be tested.

\* \* \* \* \*